United States Patent [19]
Hiranaka

[11] Patent Number: 5,890,853
[45] Date of Patent: Apr. 6, 1999

[54] DRILL AND DRILL TIP

[75] Inventor: Makoto Hiranaka, Iwaki, Japan

[73] Assignee: Toshiba Tungaloy Co., Ltd., Kawasaki, Japan

[21] Appl. No.: 888,190

[22] Filed: Jul. 3, 1997

[30] Foreign Application Priority Data

Jul. 11, 1996 [JP] Japan ................................. 8-201270

[51] Int. Cl.$^6$ .................................................. B23B 51/00
[52] U.S. Cl. ........................ 408/224; 407/113; 408/211; 408/230; 408/713
[58] Field of Search .................................. 408/211, 223, 408/224, 227, 229, 230, 713; 409/113, 114, 116, 115

[56] References Cited

U.S. PATENT DOCUMENTS

| 4,642,001 | 2/1987 | Gill et al. ................................. | 408/229 |
| 5,082,401 | 1/1992 | Neibauer ................................. | 407/114 |
| 5,544,984 | 8/1996 | Pantzar ................................... | 407/113 |
| 5,569,000 | 10/1996 | Littecke et al. ......................... | 407/114 |
| 5,586,845 | 12/1996 | Arai et al. .............................. | 407/113 |
| 5,593,255 | 1/1997 | Satran et al. ............................ | 407/116 |
| 5,720,583 | 2/1998 | Bohnet et al. ........................... | 407/113 |

FOREIGN PATENT DOCUMENTS 691416  4/1994  Japan .
9150304  6/1997  Japan .

Primary Examiner—Andrea L. Pitts
Assistant Examiner—Adesh Bhargava
Attorney, Agent, or Firm—John P. White; Cooper & Dunham LLP

[57] ABSTRACT

A drill comprising, a central cutting edge tip which is arranged on an axial portion of a distal end of a spindle body, and a peripheral cutting edge tip which is arranged on an outer peripheral portion of the distal end of the spindle body, each of the tips including a tip body, the central cutting edge tip being arranged so that its longitudinal direction is parallel with a radius direction of the spindle body, a long-side cutting edge and a long-side corner cutting edge adjacent to an axial side of the long-side cutting edge being formed as an end cutting edge, and the short-side corner cutting edge adjacent to the long-side corner cutting edge being arranged so as to go beyond the axis of the spindle body, the peripheral cutting edge tip being arranged so that its longitudinal direction is parallel with a radius direction of the spindle body, the short-side cutting edge and the short-side corner cutting edge adjacent to an outer peripheral side of the short-side cutting edge being 9 formed as an end cutting edge, and the long-side corner cutting edge adjacent to the short-side corner cutting edge being arranged so as to be inclined with respect to an axis of the spindle body.

9 Claims, 3 Drawing Sheets

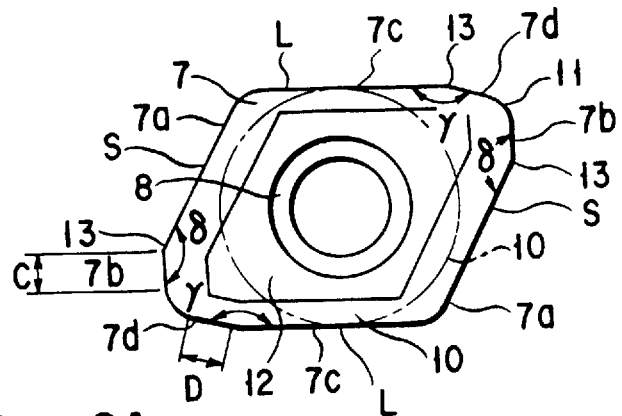
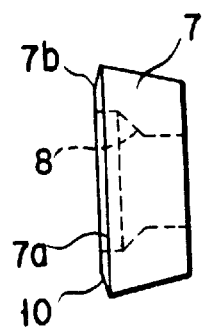
FIG. 6A  FIG. 6B
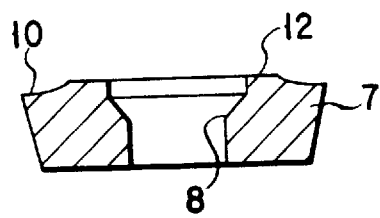
FIG. 6C
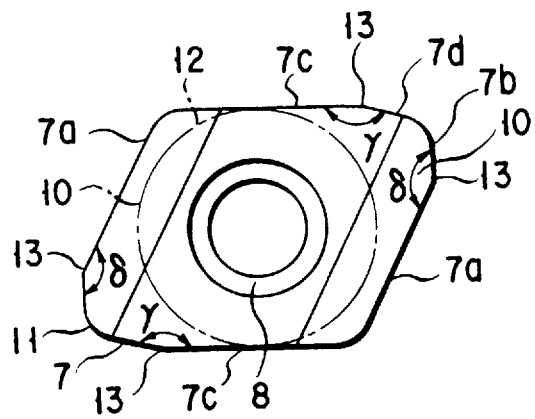
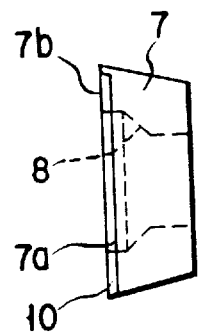
FIG. 7A  FIG. 7B
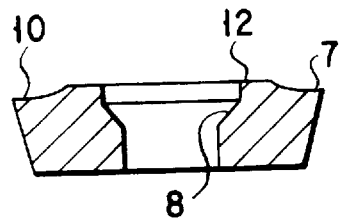
FIG. 7C

DRILL AND DRILL TIP

BACKGROUND OF THE INVENTION

The present invention relates to a throw away tool type drill which is constructed so that an end cutting edge is formed by a central cutting edge and a peripheral cutting edge, and to a drill tip. In particular, the present invention relates to a drill which can prevent a breakage of the central cutting edge, and to a drill tip which is formed with a chip breaker.

Conventionally, there is, for example, a throw away tool type drill which has been disclosed in Jpn. Pat. KOKAI Publication No. 6-91416. In this type of drill, a diamond plate-like tip is used, and the tip has the same shape and dimension and is used both as a central cutting edge and a peripheral cutting edge.

Each side of a diamond which functions as a rake face of a tip is formed with a pair of side cutting edges individually adjacent to vertex portions forming an acute angle of the diamond. Also, the vertex portion forming an acute angle is formed with a pair of V-letter corner cutting edges shorter than the side cutting edge. These V-letter corner cutting edges are mutually symmetrical with respect to a bisector of the vertex portion, and form a cross angle lager than an apical angle thereof.

A tip fixing holder is formed with a bottom face and a wall face so that fixing stiffness and accuracy of a tip to a tool body can be enhanced.

Moreover, there is Jpn. UM Appln. KOKOKU Publication No. 7-37769 having a disclosure that a different tip is used for each of a central cutting edge and a peripheral cutting edge.

A tip having a substantially plate-like rectangle is used as the central cutting edge. The tip is formed with an obtuse V-letter cutting edge ridge line in rotation symmetry at its opposite ends in a longitudinal direction thereof. On the other hand, a tip having a plate-like rectangle is used as the peripheral cutting edge. The tip is formed with a linear cutting edge at its opposite ends on each of shorter and longer sides.

In the central cutting edge tip and the peripheral cutting edge tip, their longitudinal direction ends are situated in an axial direction of the tool body, so that a diameter of cutting edge can be made small.

The aforesaid conventional drill has the following problems. Specifically, there are caused a chip breakage in the central cutting edge and a trouble on chip control in the peripheral cutting edge.

In the central cutting, there is case where a breakage is caused in a cutting edge in the vicinity of the center of a drill due to an axial direction pressure caused by feeding motion when a cutting speed becomes zero. In order to avoid such a phenomenon caused in the vicinity of the drill center, the central cutting edge tip has been conventionally arranged in a tool offset state. However, the tool offset with respect to the tip is not sufficient for enhancing a strength of a cutting edge in the vicinity of a rotational center of the drill.

Moreover, the breakage in the central cutting edge results from a factor that a tip corner angle and an inclination angle of a tip cutting edge ridge line with respect to a rotational center line of drill are not properly set. In general, in the case where the tip corner angle and the inclination angle are both large, a cutting edge strength can be enhanced. However, the aforesaid angular setting is not readily varied because of various problems such as a limitation of a tip shape, cutting balance. For this reason, the cutting edge strength could not be enhanced.

On the other hand, a trouble on a chip control is due to a difference in a cutting speed of an end cutting edge on a drill distal end portion. Specifically, in case of viewing the drill distal end portion from an axial direction of the drill, a cutting speed has a proportional relationship with a drill diameter; for this reason, the cutting speed becomes the highest speed in an outer periphery of the drill, and becomes zero in the axis thereof.

Thus, a difference in a cutting speed is great in the vicinity of the axis where cutting by the central cutting edge is executed; for this reason, chips naturally curl up. As a result, there is almost no trouble on chip control.

However, since a difference in a cutting speed is small in an outer periphery side where cutting by the peripheral cutting edge is executed, cut chips are hard to curl up. For this reason, there occurs a case where these chips curl up the tool body. Therefore, the peripheral cutting edge needs to form a chip breaker which is excellent in a chip breakage performance in order to remove these cut chips.

The diamond-shaped tip used in each of the aforesaid Publications is a positive type tip having a chip breaker. However, the tip has no sufficient allowance in its breaker width. For this reason, proper chip control is not widely achieved. Meanwhile, if the breaker width is formed wider, a tip size becomes large; for this reason, it is difficult to make small a drill diameter.

To solve the aforesaid problems, there is required a throw away tool type drill which is capable of collectively satisfying requirements such as breakage prevention of the central cutting edge, improvement in chip control of the peripheral cutting edge, and a scale-down of a drill diameter.

BRIEF SUMMARY OF THE INVENTION

The present invention has been made in view of the above circumstances. An object of the present invention is to provide a drill which can prevent a breakage of a central cutting edge.

In order to achieve the above object, the present invention provides a drill comprising; a spindle body, a central cutting edge tip which is arranged on an axial portion of a distal end of the spindle body so as to form an end cutting edge; and a peripheral cutting edge tip which is arranged on an outer peripheral portion of the distal end of the spindle body so as to form an end cutting edge; each of the tips including a tip body which is formed into a substantially platelike parallelogram; a side cutting edge which is formed on each of a pair of shorter sides of the tip body and on each of a pair of longer sides thereof; a corner cutting edge which is formed on each of vertex-portion sides of an acute angle made by the side cutting edges; and a corner blade which is formed on a crossing portion of a short-side corner cutting edge and a long-side corner cutting edge; the central cutting edge tip being arranged so that its longitudinal direction is parallel with a radius direction of the spindle body, a long-side cutting edge and a long-side corner cutting edge adjacent to an axial side of the long-side cutting edge being formed as an end cutting edge, and the short-side corner cutting edge adjacent to the long-side corner cutting edge being arranged so as to go beyond the axis of the spindle body; the peripheral cutting edge tip being arranged so that its longitudinal direction is parallel with a radius direction of the spindle body, the short-side cutting edge and the short-side corner cutting edge adjacent to an outer peripheral side of the short-side cutting edge being formed as an end cutting edge, and the long-side corner cutting edge adjacent to the short-side corner cutting edge being arranged so as to be inclined with respect to an axis of the spindle body; the side cutting edge which is an end cutting edge of the peripheral cutting edge tip and the side cutting edge which is an end cutting edge of the central cutting edge tip being arranged so as to cross each other in a rotational locus around the axis of the spindle body.

With the above construction, in the central cutting edge to which a great load is applied in an axial direction, a contact length with a work to be cut can make long, and a cutting edge breakage can be prevented.

According to the present invention, moreover, a cutting edge strength in the central cutting edge can be enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6A is a front view of a tip;

FIG. 6B is a side view of the tip;

FIG. 6C is a longitudinally sectional view of the tip;

FIG. 7A is a front view of a tip according to a modification example of the present invention;

FIG. 7B is a side view of the tip; and

FIG. 7C is a longitudinally sectional view of the tip.

DETAILED DESCRIPTION OF THE INVENTION

Figure 1A:
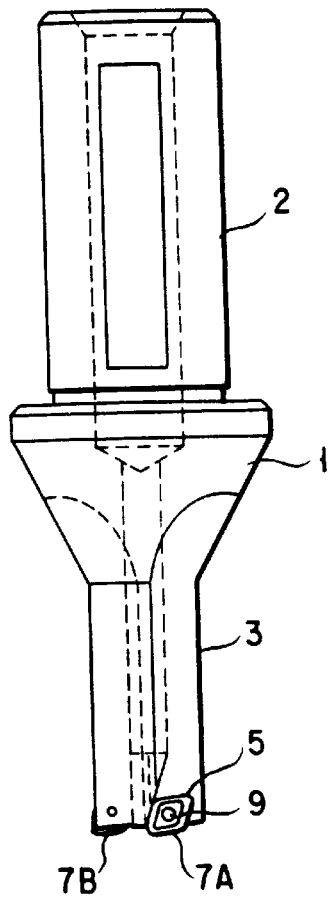
FIG. 1A is a front view of a throw away tool type drill according to a first embodiment of the present invention.
Figure 1B:
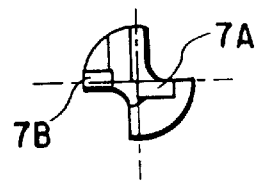
FIG. 1B is a bottom view of the drill.
Figure 2:
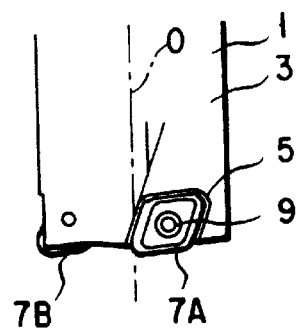
FIG. 2 is an enlarged front view of a distal end portion of the drill.

The present invention will be described below in detail with reference to the accompanied drawings. FIG. 1A is a front view of a throw away tool type drill according to a first embodiment of the present invention; FIG. 1B is a bottom plan view of the drill; FIG. 2 is an enlarged front view of a distal end portion of the drill; and FIG. 3 is an enlarged rear view of a distal end portion of the drill.

Figure 3:
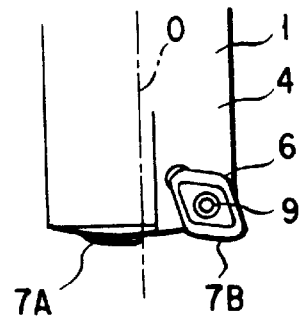
FIG. 3 is an enlarged rear view of a distal end portion of the drill.

In FIG. 1 to FIG. 3, a reference numeral 1 denotes a tool body of a throw away tool type drill which is a spindle body. The tool body 1 is provided with a shank portion at its rear end in the axial direction of the tool body. Further, the tool body 1 is formed with a first flute 3 and a second flute 4 which extend from the distal end to the rear end of the tool body and are substantially symmetrical with respect to an axis thereof.

These first flute 3 and second flute 4 are formed with tip holders 5 and 6, respectively. A central cutting edge 7A and a peripheral cutting edge 7B are fixed onto the tip holders 5 and 6 by means of a screw 9 through a middle fitting hole 8, respectively. The central cutting edge 7A and the peripheral cutting edge 7B are both formed into the same shape, and are individually a drill tip 7.

Figure 4:
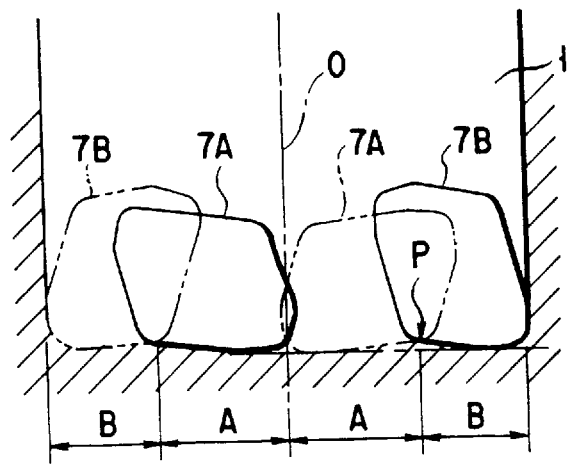
FIG. 4 is an explanatory view showing a rotational locus of a tip incorporated into the drill.
Figure 5:
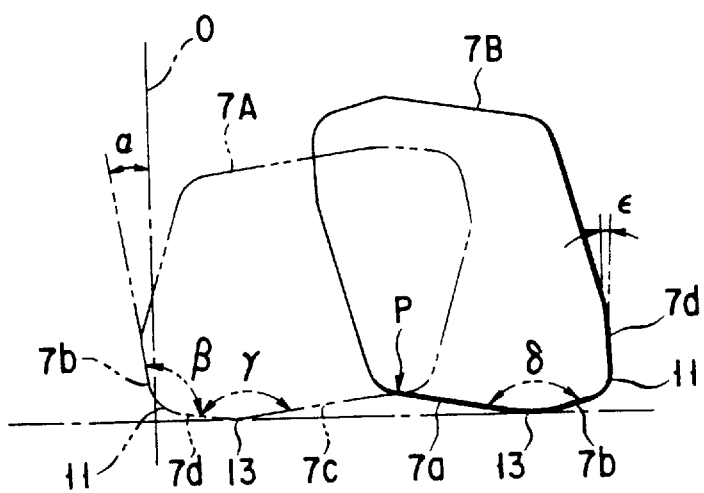
FIG. 5 is a partially enlarged view of FIG. 4.

In the case where the tip 7 is fixed into each of tip holders 5 and 6, the longer side L and the shorter side S of the tip are respectively different in position in an axial direction of the tool body 1 and a radius direction thereof, as shown in FIG. 4 and FIG. 5.

As shown in FIG. 6A, a positive type drill tip which is formed into a substantially plate-like parallelogram comprising a shorter side S and a longer side L, is applied as the drill tip 7.

A rake face of the drill tip 7 is formed with a chip breaker 10 which is cut above a cutting edge ridge line toward a boss face 12.

In the case where a chip breaker is formed over the entire circumstance of the tip as the chip breaker 10, a breaker width on the shorter side S is formed so as to become the same as a breaker width on the longer side L or to become wider than the breaker width on the longer side L.

The chip breaker 10 has transverse sections depending upon cutting conditions, work materials, a kind of working, etc., and the section of the chip breaker is selectively formed into a parallel, inclined or concave shape, etc. In this embodiment, the chip breaker 10 is situated lower than the boss face 12, and is called as a parallel type which is parallel with respect to the boss face 12.

The tip 7 has two opposite rotation symmetrical end portions. One longitudinal-direction opposite end portions of the tip 7 is formed of a side cutting edge 7a on the shorter side S and a corner cutting edge 7b on the shorter side S. The other opposite end portions of the tip 7 is formed of a corner cutting edge 7c on the longer side L and a corner cutting edge 7d on the longer side L.

The side cutting edges 7a and 7c and the corner cutting edges 7b and 7d each form an obtuse-angle V-letter cross cutting edge ridge line.

A corner blade 11 is formed at a portion where adjacent corner cutting edges 7b and 7d cross each other.

The corner cutting edge 7b and the corner cutting edge 7d are formed so as to have a cutting edge length C and a cutting edge length D which are different from each other, respectively. Also, a V-letter cross angle $\gamma$ made by the side cutting edge 7c and the corner cutting edge 7d and a V-letter cross angle $\delta$ made by the cutting edge 7a and the corner cutting edge 7b, are formed so as to be different from each other.

The corner cutting edge 7b is used as a peripheral cutting edge 7B which makes much of performing a chip control, and is formed having a short cutting edge length C and a small angle $\gamma$.

The corner cutting edge 7d is used as a central cutting edge 7A which makes much of a cutting edge strength, and is formed having a long cutting edge length C and a large angle $\delta$.

A thrust force considerably acts on the central cutting edge 7A in the axial direction of the tool body 1. For this reason, there is a need of taking a breakage of the cutting edge into consideration. Therefore, in order to reduce a linear or surface load with respect to the thrust force, the central cutting edge has a cutting edge length D which is formed longer. Also, the angle $\delta$ is larger than the angle $\gamma$.

In the central cutting edge 7A, the side cutting edge 7c on the longer side L and the corner cutting edge 7d on the longer side L which is adjacent to the side cutting edge 7c and is situated on an inner circumstantial side, are used as an end cutting edge. Moreover, in order to prevent a breakage of the cutting edge of the central cutting edge 7A, a corner blade 11 is arranged in the vicinity of the rotational center of the tool body 1, as shown in FIG. 5. Also, the central cutting edge 7A is attached at an angle such that an inclination angle α of a cutting edge ridge line of the corner cutting edge 7b with respect to an axis O of the tool body 1 becomes a relation of α>0°.

The relation of α>0° is obtained by setting a corner angle β of the tip 7 as β>90°, and setting an outer angle of the central cutting edge 7A to an arbitrary angle. Preferably, a value of the inclination angle α should be set within a range of 0°<α≦20°.

On the other hand, in the peripheral cutting edge 7B, the side cutting edge 7a on the shorter side S and the corner cutting edge 7b on the shorter side S which is adjacent to the side cutting edge 7a and is situated on an outer circumstantial side, are used as an end cutting edge.

As described above, the corner cutting edge 7d adjacent to the corner cutting edge 7b via a corner blade 11 is used as an end cutting edge. The corner cutting edge 7d is arranged in a state of being inclined at a clearance angle ε with respect to the axis O of the toll body 1 so as to have a function as a back taper.

Moreover, in the peripheral cutting edge 7B, the shorter side S of the chip breaker 10, that is, a side having a wide breaker width is situated on a cutting face side, so that a bending stress can be forcedly generated. Thus, flowing chips can be divided or curled up. Therefore, this serves to prevent a trouble such that these chips are wound around the tool body 1 from being caused.

Also, the longer side L of the chip breaker 10 of the peripheral cutting edge 7B, that is, a side having a normal breaker width, is situated in a radius direction; therefore, a length of the tip 7 does not become long in the radius direction thereof. Thus, this contributes to making small a diameter of the tool body 1.

The central cutting edge 7A and the peripheral cutting edge 7B are arranged so that the side cutting edge 7c and 7a cross each other in a rotational locus on a plane including the drill axis O. This crossing point is set as "P".

In the crossing point P, the tip 7 is incorporated so that a cutting width of the peripheral cutting edge 7B becomes shorter than that of the central cutting edge 7A. Therefore, a chip control in the central cutting edge 7A can be improved because a difference in a flow speed between inner and outer sides of the chip becomes great in the central cutting edge 7A.

In this type of throw away tool drill, preferably, a diameter-direction component of cutting force by the central cutting edge and peripheral cutting edge is offset so as to become zero. If the diameter-direction component is not mutually offset, and then, cutting unbalance occurs, a drill distal end portion is affected by a bending action, and consequently, becomes an unbalance state. For this reason, there is induced a chatter vibration, etc.

The chatter vibration is a factor of causing cutting edge chipping, a cutting edge breakage, etc.; for this reason, a tool life is remarkably made short. Also, if there is a difference between a cutting edge starting point of the central cutting edge and a cutting edge starting point of the peripheral cutting edge, unbalance occurs in drill engagement.

In the drill according to the present invention, the central cutting edge and the peripheral cutting edge coincide with each other in their forefront position so that simultaneous engagement of their cutting edge starting points is securely achieved. As is evident from the above description, a cutting edge breakage is taken into consideration.

Moreover, the tip 7 can be used both as a central cutting edge and a peripheral cutting edge; therefore, even if the tip 7 is of a positive type, four portions per tip are available. This serves to reduce tool cost. Also, in the case where a negative type tip 7 is applied, eight portions are available in both faces of the tip if a drill which differs in its rotational direction is prepared.

FIG. 7 shows a modification example of the tip 7. In this modification example, like reference numbers are used to designate portions having the same function as the aforesaid tip 7.

A tip 7 is formed with a chip breaker 10 which extends along only cutting edges 7a and 7b on a shorter side S. Even such a tip sufficiently has drill performance and chip control performance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A drill comprising:

a spindle body;

a central cutting edge tip which is arranged on an axial portion of a distal end of said spindle body so as to form an end cutting edge; and a peripheral cutting edge tip which is arranged on an outer peripheral portion of said distal end of said spindle body so as to form an end cutting edge, each of said tips including a tip body which is formed into a substantially plate-like parallelogram;

a side cutting edge which is formed on each of a pair of shorter sides said tip body and on each of a pair of longer sides thereof;

a corner cutting edge which is formed on each of vertex-portion sides of an acute angle made by said side cutting edges; and a corner blade which is formed on a crossing portion of a short-side corner cutting edge and a long-side corner cutting edge, said central cutting edge tip being arranged so that its longitudinal direction is parallel with a radius direction of said spindle body, a long-side cutting edge and a long-side corner cutting edge adjacent to an axial side of said long-side cutting edge being formed as an end cutting edge, and said short-side corner cutting edge adjacent to said long-side corner cutting edge being arranged so as to go beyond the axis of said spindle body, said peripheral cutting edge tip being arranged so that its longitudinal direction is parallel with a radius direction of said spindle body, said short-side cutting edge and said short-side corner cutting edge adjacent to an outer peripheral side of said short-side cutting edge being formed as an end cutting edge, and said long-side corner cutting edge adjacent to said short-side corner cutting edge being arranged so as to be inclined with respect to an axis of said spindle body, said side cutting edge which is an end cutting edge of said peripheral cutting edge tip and said side cutting edge which is an end cutting edge of said central cutting edge tip being arranged so as to cross each other in a rotational locus around the axis of said spindle body.

2. A drill according to claim 1, in which said peripheral cutting edge tip and said central cutting edge tip are arranged so that a cutting width of said peripheral cutting edge tip becomes smaller than a cutting edge of said central cutting edge tip in a rotational locus around the axis of said spindle body.

3. A drill according to claim 1, in which said central cutting edge tip is arranged so that its corner blade is situated in the vicinity of an axis of said spindle body and its corner cutting edge is inclined beyond the axis thereof.

4. A drill according to claim 1, in which said peripheral cutting edge tip and said central cutting edge tip are arranged so that starting points of their cutting edges situated on the axial-direction forefront position of said spindle body coincide with each other.

5. A drill according to claim 1, in which said peripheral cutting edge tip is provided with a chip breaker which is formed on only short side of said tip body.

6. A drill according to claim 1, in which said tip is provided with a chip breaker which is formed over the entire periphery of said tip body, and a chip breaker width on a short side being at least the same as a chip breaker width on a long side.

7. A drill according to claim 1, in which said tip is constructed so that a crossing angle δ of said short-side cutting edge and said corner cutting edge is formed larger than a crossing angle γ of said long-side cutting edge and said corner cutting edge.

8. A tip attached to a distal end of a drill, having a pair of longer sides each used as a central cutting edge and a pair of shorter sides each used as a peripheral cutting edge, comprising:

a tip body which is formed into a substantially plate-like parallelogram;

a side cutting edge which is formed on each of the pair of shorter sides of said tip body and on each of the pair of longer sides thereof;

a corner cutting edge which is formed one each of vertex-portion sides of an acute angle made by said side cutting edges;

a corner blade which is formed on a crossing portion of a short-side corner cutting edge and a long-side corner cutting edge; and a chip breaker which is formed on only the pair of shorter sides of said tip body.

9. A tip attached to a distal end of a drill, having a pair of longer sides each used as a central cutting edge and a pair of shorter sides each used as a peripheral cutting edge, comprising:

a tip body which is formed into a substantially plate-like parallelogram;

a side cutting edge which is formed on each of the pair of shorter sides of said tip body and on each of the pair of longer sides thereof;

a corner cutting edge which is formed on a vertex-portion side of an acute angle make by said side cutting edges;

a corner blade which is formed on a crossing portion of a short-side corner cutting edge and long-side corner cutting edge; and a chip breaker which is formed over the entire periphery of said tip body, the chip breaker width on a shorter side of said tip being greater than the chip breaker width on a longer side thereof.

* * * * *